United States Patent [19]

Moore

[11] 4,286,546

[45] Sep. 1, 1981

[54] DOG WATERING DISH

[76] Inventor: Terry F. Moore, 550 Highland Dr., Danville, Calif. 94526

[21] Appl. No.: 113,770

[22] Filed: Jan. 21, 1980

[51] Int. Cl.³ .............................................. A01K 7/00
[52] U.S. Cl. ....................................... 119/61; 119/72
[58] Field of Search ............................ 119/61, 72, 73

[56] References Cited

U.S. PATENT DOCUMENTS

| 968,613 | 8/1910 | Van Ostrand | 119/72 |
| 3,076,435 | 2/1963 | Seymour | 119/61 X |
| 3,943,889 | 3/1976 | Sparber | 119/73 |

Primary Examiner—Hugh R. Chamblee
Attorney, Agent, or Firm—August E. Roehrig, Jr.

[57] ABSTRACT

An anti-splash animal watering container including a water holding dish or bowl having straight sides in combination with an apertured disc which floats upon the liquid carried therein. The floating disc is of a predetermined thickness and weight such that it floats in the liquid with a substantial portion extending above the liquid level. At its center, an aperture is located through which an animal has access to the liquid in the bowl. This aperture can be fitted with removable sleeves so that the size of the aperture can be changed to enable the use of the watering device for different sized animals and still retain its anti-splash characteristics. In one embodiment, a quantity of air is entrapped within a chamber of the disc for floating on the liquid.

16 Claims, 8 Drawing Figures

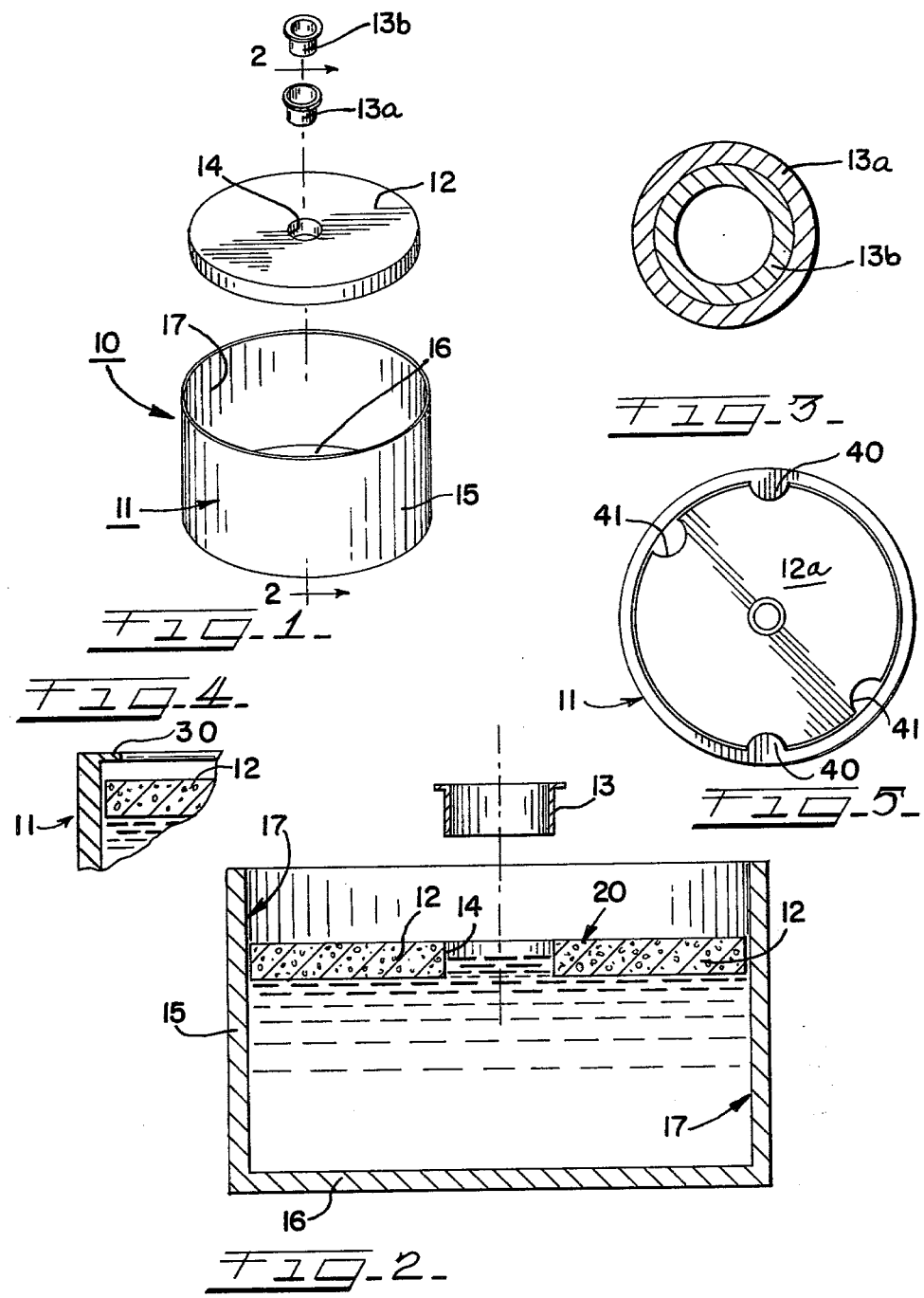

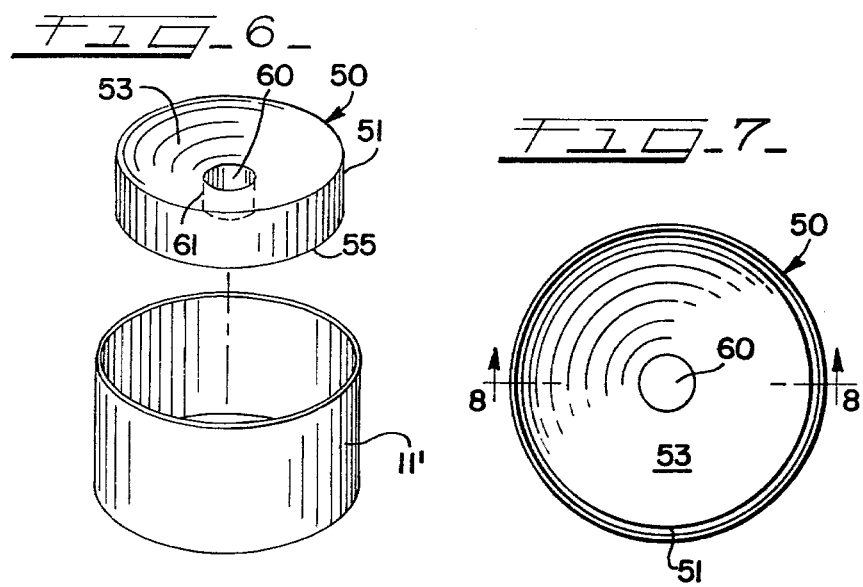
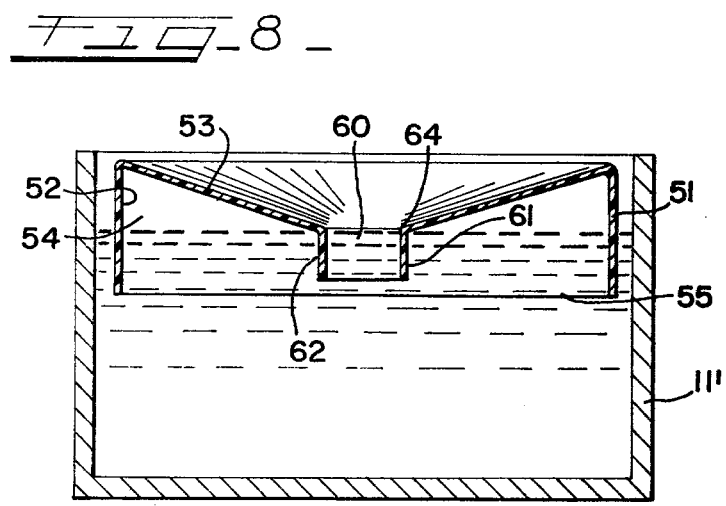

ically extending sides 15 disposed substantially perpendicular to the base surface 16 thereof. The vertical sides 15 are of sufficient height relative to the base surface 16 to permit substantial amounts of liquid to be carried therein, minimizing the need for frequent refilling.

DOG WATERING DISH

BACKGROUND OF THE INVENTION

This invention relates in general to animal watering devices and, in particular, to animal watering dishes which prevent accidental splashing or spilling of the water when the animal is drinking.

More specifically, this invention relates to an improved animal watering container having an apertured disc which floats upon the contents of the container. Removable sleeves can be inserted in the aperture to adapt the device for use by different size animals.

The proper care and feeding of domestic animals, such as household pets, requires that a supply of water or other liquid be available to the animal at various times during the day. Typically, this liquid is furnished in an open dish or bowl, thereby exposing it to various contaminants such as dirt and dust, as well as promoting loss due to evaporation. In addition, a frequent annoyance to animal owners is the slopping or spilling of liquid from the bowl when the animal drinks. While this problem is generally considered an annoyance, the liquid lying on the floor is often hazardous and can cause accidents.

Various attempts to solve this problem are shown in U.S. Pat. No. 3,076,435 for "Liquid Dispensing Receptacle," U.S. Pat. No. 3,152,576 for "Anti-Splash and Feeding Device for Pet Animals," and U.S. Pat. No. 3,589,340 for "Animal Feeder." While the devices disclosed in these patents reduce the amount spilled in most applications, such prior art does not recognize nor eliminate the source of the problem which causes the liquid to be splashed from the dish.

SUMMARY OF THE INVENTION

It is, therefore, an object of this invention to improve animal watering devices.

A further object of this invention is to minimize splashing of the contents of a container when an animal is drinking.

Another object of this invention is to minimize contamination of the liquid within the container.

Another object of this invention is to minimize the loss of liquid from the container due to evaporation.

Still another object of this invention is to adapt the watering container for use by animals of different size.

Another object of this invention is to minimize spillage from the container when being carried or inadvertently bumped.

A still further object of the invention is to provide an uncomplicated watering device giving rise to manufacturing economy and simplicity in maintenance and use.

These and other objects are attained in accordance with the present invention wherein there is provided an animal watering device comprising a liquid holding dish into which is placed in a disc-like member which floats upon the liquid contained therein. The disc has a central aperture through which an animal has limited access to the contents of the dish, thereby minimizing the natural splashing and spilling that occurs when the animal is drinking. This aperture can be fitted when removable sleeves such that the diameter of the aperture is readily changed, according to the size of the animal, simply by changing the sleeve size. In this way the device can be used for animals of varying size without substantial alteration to the device as a whole.

DESCRIPTION OF THE DRAWINGS

Further objects of this invention, together with additional features contributing thereto, and advantages accruing therefrom, will be apparent from the following description of several embodiments of the invention when read in conjunction with the accompanying drawings wherein:

FIG. 1 is a side perspective view of the invention with portions thereof shown in an exploded illustration;

FIG. 2 is a vertical sectional view of the invention shown in an operative position, taken along lines 2—2 of FIG. 1, with a portion thereof depicted in an exploded illustration;

FIG. 3 is a top plan view of several removable apertured sleeves shown in an operative position;

FIG. 4 is a partial sectional view of another embodiment of the invention;

FIG. 5 is a top schematic view of still another embodiment of the invention;

FIG. 6 is an exploded perspective side view of still another embodiment of the invention illustrating a modified disc member;

FIG. 7 is a top schematic view of the disc member of FIG. 6; and

FIG. 8 is a sectional view of the disc member taken along lines 8—8 of FIG. 7.

DESCRIPTION OF THE PREFERRED EMBODIMENTS

Referring now to the drawings in greater detail, in FIG. 1 there is shown a perspective view of a watering container with the components thereof in an exploded illustration to provide an improved view of each. The watering container shown therein, generally designated 10, includes a main liquid holding container 11 in combination with a flat disc-like member 12 and a plurality of sleeve members 13A and 13B adapted to be inserted into an aperture 14 at the center of disc member 12.

The main liquid holding container 11 is circular in cross section, although it may be formed in other configurations (not shown) and has vertically extending sides 15 disposed substantially perpendicular to the base surface 16 thereof. The vertical sides 15 are of sufficient height relative to the base surface 16 to permit substantial amounts of liquid to be carried therein, minimizing the need for frequent refilling.

The disc member 12 has a horizontal cross sectional shape, conforming to that of the liquid holding container 11, with an outer diameter slightly smaller than the diameter of the inside container walls 17, as best shown in FIG. 2. This configuration permits axial and angular movement of the disc member 12 about an axis normal to the base surface 16.

As shown in FIGS. 1 and 2, a vertically extending aperture 14, having an axis substantially normal to the disc surface 20, is located at or about the center of the disc member 12. The aperture, as shown therein, is circular in cross section, although it may be formed in other configurations (not shown) as well. The size of the aperture 14 is of a size such that only an animal's tongue is capable of fitting therethrough, thereby prohibiting the animal from immersing its muzzle into the liquid, and consequently eliminating a major source of liquid spillage when the animal shakes its muzzle to remove the excess water.

In addition, to prevent the animal from wetting its muzzle, the disc member 12 is constructed of a suitable buoyant material and has a sufficient vertical thickness such that it floats high upon the liquid carried within the container. The upper disc surface 20 floats at a height sufficiently above the liquid, as shown in FIG. 2, such that an upward force is exerted against the animal if it attempts to urge the disc downward when drinking. These characteristics prevent the immersion of the animal's muzzle in the liquid, thereby contributing to the overall effectiveness of the limited aperture concept and the invention as a whole.

In order to adapt the invention quickly and easily to a variety of animals of differing size, without substantially altering the invention, the floating disc 12 is fitted with removeable apertured sleeves 13, inserted into the central aperture 14 such that the resulting diameter can be varied as desired. The sleeves 13 are designed such that their shape corresponds with that of the aperture 14, all having an outer diameter equal to or slightly smaller than the diameter of the aperture 14, so that they can be fixedly inserted therein. The inner diameter, proscribed by the sleeve wall thickness, varies for each sleeve. Consequently, a desired aperture diameter can be easily and quickly attained by selection and insertion of a sleeve having the proper diameter.

Alternatively, the sleeves 13 can be designed so that a set of sleeves can be employed wherein the diameter is attained by concentrically "stacking" a series of sleeves within one another. The total wall thickness created thereby is sufficient to create an aperture of the desired diameter, as shown in FIG. 3. In this configuration, each sleeve has a standard wall thickness with one sleeve having an outer diameter equal to the inside diameter of aperture 14, while the others in the series have descending diametric size such that the inside diameter of one corresponds to the outer periphery of its smaller counterpart, as best shown in FIG. 3.

Referring now to FIG. 4, there is illustrated another embodiment of the anti-splash animal water container of the invention. The container of FIG. 4 is smaller to the preceding described embodiment, but container 11 includes an inwardly projecting, continuous concentric lip 30 forming an open upper portion having a diameter less than the diameter of disc member 12. The provision of the lip 30 prevents removal of the disc member 12 from the container by acting as an upper stop member. It should be apparent that the lip 30 may comprise one or more non-continuous portions if desired.

Referring to FIG. 5, there is illustrated still another embodiment of the anti-splash animal water container of the invention which prevents splashing in the manner previously described. The container 11 includes a pair of diametrical disposed lips 40 in the form of a pair of tab-like members located adjacent the top thereof to aid in retention of disc member 12a within the container. Disc member 12a includes a pair of oppositely disposed notches 41 which possess a configuration substantially corresponding to lips 40. In FIG. 5 the notches 41 are oriented in non-alignment with lips 40 and the disc member 12a is retained within the container 11. In the event that removal of disc 12a from the container is desired, it is only necessary to rotate disc member 12a relative to the container to align the notches and lip, and lift the disc member 12a from the container such as, for example, by engagement of the disc member at aperture 14. It is within the scope of the invention to utilize numbers and shapes of lips 40 and notches 41 other than the two respective elements as specifically shown.

Referring now to FIGS. 6 through 8, there is illustrated another embodiment of the anti-splash animal water container of the invention. The embodiment of the invention illustrated in FIGS. 6 through 8 functions similar to the invention of the preceding embodiments, but the disc member 50 includes a modified form. Referring to FIGS. 6 through 8, the disc member 50 has a continuous surface of revolution to provide a peripheral disc body 51, such as a cylinder as shown, and forming a continuous concentric inner surface 52. The upper end of body 51 is integrally enclosed by a concave upper surface 53, such as in the form of an inverted frustoconical surface, to enclose an air entrapment chamber 54, as shown in FIG. 8, while the bottom end 55 of the disc body 51 is open. An access aperture 60 is formed through concave upper surface 53 by an integrally coupled, open ended aperture member 61 having a tubular shape. The tubular member 61 is concentrically arranged about the vertical center line of the disc member 50, such that the tubular member 61 creates an outer continuous peripheral surface 62 (FIG. 8) positioned within chamber 54. The air entrapment chamber 54 is thus defined by the inner surface 52 of the disc body 51, the outer surface 62 of the tubular member 61, and the concave upper surface 53 of the disc member.

The air entrapped within the chamber 54 causes the disc member 50 to float on the surface of liquid within a container 11', similar to the container 11 shown in FIG. 1. The chamber 54 is designed to entrap a quantity of air sufficient to cause the disc member 50 to float with the top 64 of the tubular member 61 being approximately disposed at the surface of the liquid within the container as shown in FIG. 8. Moreover, the configuration of the chamber 54 entraps the largest volume of air near the perimeter of the disc member 51, due to the presence of the concaved upper surface 53, to increase stability and prevent tipping while an animal is drinking from the access aperture 60. The concave upper surface 53 also acts to allow any excess water to run back into the access aperture 60, which is disposed concentric to the vertical centerline of disc member 50. An animal is provided increased access to the liquid in a container by the embodiment of FIGS. 6 through 8, since the level of the water or other liquid is positioned near the top 64 of the access aperture 60.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An anti-splash container for an animal comprising
   a container means to retain a liquid for consumption by an animal, said container means having an open upper portion,
   disc means adapted to float on the surface of the liquid retained in said container means, said disc means covering at least a portion of said upper open portion to prevent splashing of the liquid from the container during consumption by an animal, said disc means including an access aperture to permit penetration therethrough by an animal for access to the liquid retained by the container means, and said access aperture including a plurality of selectable sleeve members having internal channels forming variable sized apertures insertable into said access aperture and having an integral opening permitting penetration by an animal, said plurality of sleeve members being mountable in stacking relationship to permit removal of one or more selected sleeve members to create a predetermined sized access aperture.

2. The anti-splash container according to claim 1 wherein said disc means includes a disc member.

3. The anti-splash container according to claim 1 wherein said disc means is formed from a material having a buoyancy sufficient to inhibit total submersion of said disc means into the liquid retained in said container during penetration of said access aperture by an animal.

4. The anti-splash container according to claim 1 wherein said upper open portion possesses a substantially circular cross-sectional configuration.

5. The anti-splash container according to claim 4 wherein said disc means includes a corresponding concentric cross-section as said upper open portion and possesses a diameter slightly less than the diameter thereof.

6. The anti-splash container according to claim 1 wherein said access aperture is of a size to permit penetration solely by the tongue of an animal.

7. The splash container according to claim 1 wherein said container means includes lip means positioned adjacent said open upper portion to prevent removal of said disc means from said container means.

8. The splash container according to claim 7 wherein said lip means includes at least one lip member.

9. The splash container according to claim 8 wherein said disc means includes a peripheral edge having at least one notch corresponding to said lip member to permit removal of said disc means from said container means upon alignment of said notch with said lip member.

10. The anti-splash container according to claim 1 wherein said disc means includes a concave upper surface.

11. The anti-splash container according to claim 10 wherein said concave upper surface possess an inverted frustoconical configuration.

12. The anti-splash container according to claim 11 wherein said access aperture is positioned adjacent the apex of said inverted conical configuration.

13. An anti-splash container for an animal comprising container means to retain a liquid for consumption by an animal, said container means having an open upper portion, a container closure for covering at least a portion of said opening of said container means to prevent splashing of the liquid from the container during consumption by an animal, said container closure having an access aperture means formed therein to permit penetration therethrough by an animal for access to the liquid retained in the container means, and said container closure having flange means about the outer peripheral edge thereof and said access aperture means which extend downwardly therefrom into a liquid contained within said container means to form an air entrapment chamber between said flange means to float said container closure on the surface of the liquid retained in said container means.

14. The anti-splash container according to claim 13 wherein said container closure has an upper surface having a concave configuration.

15. The anti-splash container according to claim 14 wherein said access aperture means is formed by a tubular member integrally coupled to said upper surface.

16. The anti-splash container according to claim 15 wherein said container closure floats on the surface of the liquid retained in said container means at an approximate position to orient the top of said tubular member at the surface of the liquid.

* * * * *